United States Patent [19]

Takeuchi et al.

[11] Patent Number: 4,621,183

[45] Date of Patent: Nov. 4, 1986

[54] POWDER SURFACE WELDING METHOD

[75] Inventors: Yukou Takeuchi; Masaru Nagata, both of Nagoya, Japan

[73] Assignee: Daido Tokushuko Kabushiki Kaisha, Nagoyo, Japan

[21] Appl. No.: 663,929

[22] Filed: Oct. 23, 1984

[30] Foreign Application Priority Data

Oct. 26, 1983 [JP] Japan ................................. 58-200576
Oct. 28, 1983 [JP] Japan ................................. 58-201052

[51] Int. Cl.⁴ ............................................. B23K 15/00
[52] U.S. Cl. ........................ 219/121 PL; 219/121 PY; 219/121 PQ; 219/76.16; 427/34
[58] Field of Search ................. 219/121 PL, 121 PY, 219/121 PP, 121 PQ, 76.16; 427/34; 313/231.31, 231.41, 231.51

[56] References Cited

U.S. PATENT DOCUMENTS

| | | | |
|---|---|---|---|
| 3,304,402 | 2/1967 | Thorpe | 219/121 PL |
| 3,676,638 | 7/1972 | Stand | 219/121 PL |
| 3,823,302 | 7/1974 | Muehlberger | 219/121 PL |
| 4,125,754 | 11/1978 | Wasserman et al. | 219/121 PL |
| 4,262,034 | 4/1981 | Anderson | 219/121 PL |
| 4,370,538 | 1/1983 | Browning | 219/76.16 |
| 4,371,312 | 2/1983 | Tank | 219/121 PL |

*Primary Examiner*—M. H. Paschall
*Attorney, Agent, or Firm*—Sughrue, Mion, Zinn, Macpeak & Seas

[57] ABSTRACT

A powder surface welding method using a plasma torch is disclosed, which uses a surfacing powder containing not less than 95% of particles having a particle size of −60 mesh to +250 mesh. This welding is carried out at a welding speed of not less than 3.8 mm/sec without weaving the plasma torch. Particularly, the distance L between the end of the plasma arc jetting nozzle in the plasma torch and the base material to be surfaced is regulated to be within a range of $0.5\,D_s+6 \leq L \leq D_s+8$, and the offset angle $\theta$ of the axial center of the plasma torch with respect to the rotational center of the base material is regulated to be within a range of $7° \leq \theta \leq 20°$.

16 Claims, 15 Drawing Figures

POWDER SURFACE WELDING METHOD

BACKGROUND OF THE INVENTION (1) Field of the Invention

This invention relates to a powder surface welding method applicable for build-up welding with powder, and more particularly to a powder surface welding method suitable for surfacing an engine valve used in automobile vehicle or ship vessel and for other build-up weldings.

(2) Description of the Prior Art

For example, in the manufacture of engine valves for use in automobile vehicle, the surface welding to the valve face has frequently been performed in order to enhance the thermal resistance and abrasion resistance of the valve.

According to this surface welding method, however, it is required that the deposition to a base material such as valve or the like is complete, the composition of the deposited metal is close to the composition of the base material prior to the surface welding, the shape of weld bead is good, the yield of deposited metal is high, and the like. In order to satisfy these requirements, it is attempted to adopt plasma arc welding with powder at present.

In this powder welding with a plasma torch, a plasma working gas is supplied from a space between a bar electrode and an inner tube surrounding the bar electrode, while a surfacing powder is supplied from a space between the inner tube and an outer tube surrounding the inner tube and provided at its end with a plasma arc jetting nozzle into a plasma arc, whereby the surfacing powder is fused and surfaced onto a base material to be welded.

Figure 1:
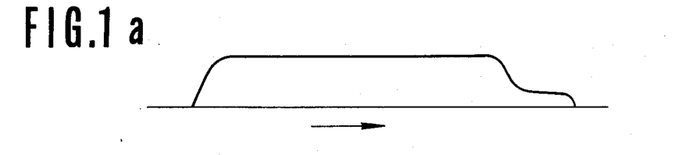
FIGS. 1a and 1b are schematic views illustrating a change in the height of weld bead, respectively.

However, when using such a plasma torch for surfacing the base material with powder, more large-size particles tend to advance than small-size ones in the course of supplying the surfacing powder from a powder feeding means through a powder supply hose and the space between the inner and outer tubes in the torch into the plasma arc. Therefore, when the particle size distribution of the surfacing powder, welding speed, powder form or the like is unsuitable, if the supply of the surfacing powder is stopped in accordance with the completion of the surface welding, the cutting of powder supply becomes bad because the amount of small-size particles supplied at the last stage of the surface welding becomes larger as shown in FIG. 1a, and consequently a weld bead having a lower height is formed. Thus, there is obtained no desirable weld bead as shown in FIG. 1b. Therefore, if it is intended to conduct ring-like welding such as the surface welding on the engine valve face for automobile vehicle, the last fused metal composed of fine powders piles on the first surfaced portion, so that the bead form in the piled portion is bad.

Further, there are caused troubles when the arrangement between the plasma torch and the base material to be surfaced such as the distance in up and down directions, offset amount in horizontal direction or the like, the welding speed and so on are unsuitable. For instance, when the distance between the plasma torch and the base material is too large, the plasma arc becomes unstable and also the lack of fusion is caused between the deposited metal and the base material. While, when the distance is too small, the form of weld bead is poor. Alternatively, when the offset amount is unsuitable, molten metal of the surfacing powder is not well deposited on the face of the base metal to be surfaced and may fall down from the face.

SUMMARY OF THE INVENTION

The invention is to solve the aforementioned problems of the prior art and to provide a powder welding method which is considerably good in the form of weld bead by plasma arc welding with powder and in the fusion state between deposited metal and base material to be surfaced, and particularly can give considerably good bead form and fusion state even when forming a ring-like weld portion on a face of an engine valve for automobile vehicle.

According to the invention, there is the provision of a method of welding a base material to be surfaced with a surfacing powder by means of a plasma torch wherein a plasma working gas is supplied from a space between a bar electrode and inner tube surrounding the bar electrode and the surfacing powder is supplied from a space between the inner tube and an outer tube surrounding the inner tube and provided at its end with a plasma arc jetting nozzle into a plasma arc while rotating the base material, characterized in that said surfacing powder contains not less than 95% of powder having a particle size of $-60$ mesh to $+250$ mesh, and the welding is carried out at a welding speed of not less than 3.8 mm/sec.

In the preferred embodiment of the invention, the surfacing powder is one produced by gas atomization or gas-water atomization, the particle size is within a range of $-100$ mesh to $+250$ mesh, the welding is carried out at a welding speed of not less than 4 mm/sec without weaving the plasma torch, and a distance (L,mm) between the end of the plasma arc jetting nozzle and the base material is within a range of $0.5Ds+6 \leq L \leq Ds+8$ (wherein Ds is an opening diameter (mm) of the plasma arc jetting nozzle) and an offset angle ($\theta$) of axial center of the torch with respect to the rotational center of the base material is within a range of $7° \leq \theta \leq 20°$ at a delay angle side.

BRIEF DESCRIPTION OF THE DRAWING

The invention will now be described in detail with reference to the accompanying drawing, wherein.

DETAILED DESCRIPTION OF THE INVENTION

Figure 2:
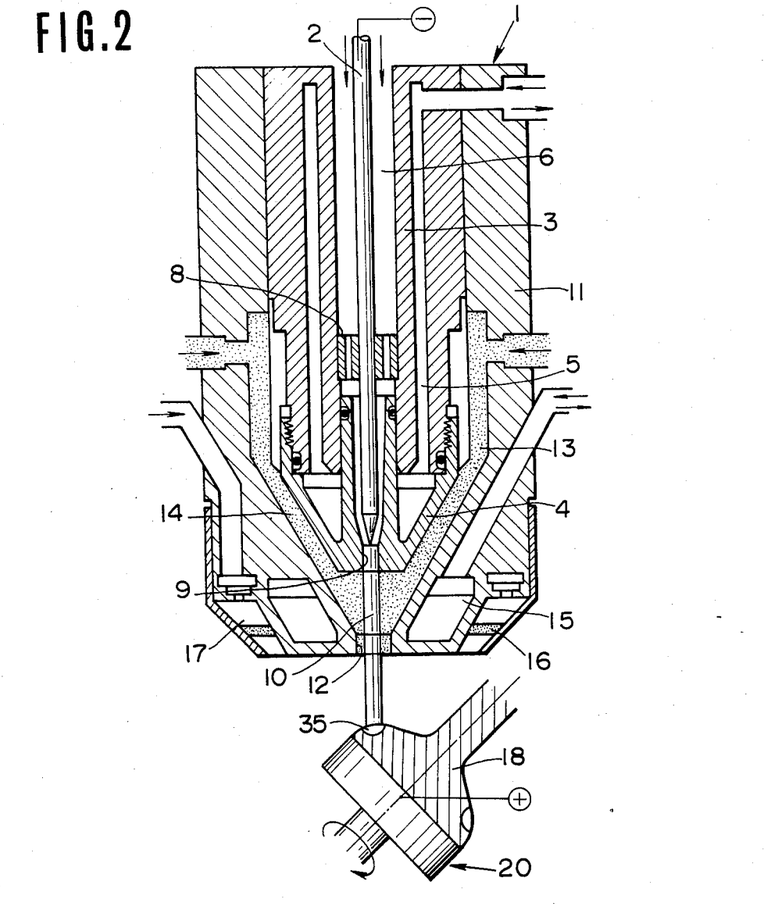
FIG. 2 is a longitudinal sectional view of the plasma torch for use in the powder surface welding method according to the invention.

In FIG. 2 is shown an embodiment of the plasma torch for use in the powder surface welding method according to the invention together with an engine valve as a base material to be surfaced. This plasma torch 1 is provided at its center with a bar electrode 2 connected to a negative pole side of a power source (not shown), and an inner tube 3 concentrically surrounding the bar electrode 2 at a certain interval. In the illustrated embodiment, the inner tube 3 is provided at its lower end with a threaded tip 4, but the inner tube 3 may be integrally united with the tip 4. A cooling water passage 5 is formed in the interiors of the inner tube 3 and the tip 4, respectively, while a passage for plasma working gas 6 is defined between the bar electrode 2 and the inner tube 3.

Figure 3:
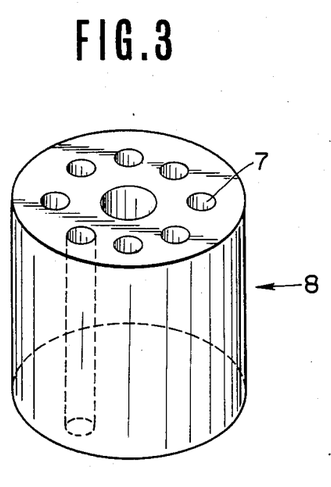
FIG. 3 is a perspective view of the flow regulating member for plasma working gas used in FIG. 2.
Figure 4:
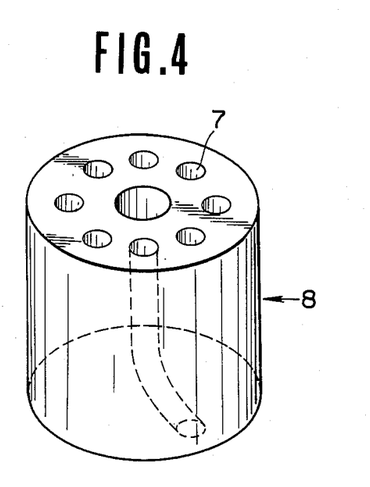
FIG. 4 is a perspecive view of another embodiment of the flow regulating member for plasma working gas.

In the plasma working gas passage 6 defined between the bar electrode 2 and the inner tube 3 is disposed a flow regulating member 8 provided with plural holes 7 for passing the plasma working gas. Moreover, these holes 7 may be formed in the flow regulating member 8 at a circumferentially equal interval in a straight form as shown by a dotted line in FIG. 3 or in a spiral form as shown by a dotted line in FIG. 4. In any case, the flow regulating member 8 serves to regulate the flow of the plasma working gas supplied from the upper part of the torch in an arrow direction to thereby uniformize the flow of the plasma working gas at its horizontal section. As a result, the fusion of a surfacing powder as well as the adhesion of a deposited metal to a base material are also uniformized as mentioned later. And also, the flow regulating member 8 acts as a retainer for the bar electrode 2, which always holds the bar electrode 2 at a concentric state with respect to the inner tube 3, resulting in the prevention of uneven loss of bar electrode 2.

In the lower end of the inner tube 3 (the tip 4 in the illustrated embodiment) is formed a plasma arc restraining nozzle 9. Further, an outer tube 11 is arranged around the outer periphery of the inner tube 3 at a certain space. At the lower end of the outer tube 11 is formed a plasma arc jetting nozzle 12. Between the inner tube 3 and the outer tube 11 is defined a powder feeding passage 13, whereby a surfacing powder 14 can be supplied together with a powder carrying gas from a powder feeding device (not shown) to a plasma arc 10. Moreover, a cooling water passage 15 is formed in the interior of the outer tube 11 for cooling the nozzle 12.

Further, an annular flow regulating member 16 for shield gas is disposed near the lower portion of the outer tube 11 at a concentric stats with the plasma arc jetting nozzle 12, which serves to uniformly and evenly shield the surrounding of the plasma arc 10 with a shield gas supplied through a shield gas passage 17. In this case, the shield gas flow regulating member 16 is located inward from the opening end of the plasma arc jetting nozzle 12 in order to prevent the nonuniform or insufficient supply of the shield gas due to the increase of permeation resistance based on the adhesion of splashes of powder and fused metal to the flow regulating member 16 during the surfacing, whereby the adhesion of splashes can be prevented to always hold the permeation resistance of the flow regulating member 16 at constant and to well develop the shielding effect against the plasma arc. Moreover, the shield gas flow regulating member 16 is made from a laminated net body, a sintered body of metal or ceramic having an appropriate permeability (density), and the like.

Beneath the plasma torch 1 having the above mentioned structure is arranged a base material 18 to be surfaced such as an engine valve for automobile vehicle, which is rotatable at a state held by a backing member 20.

Figure 5:
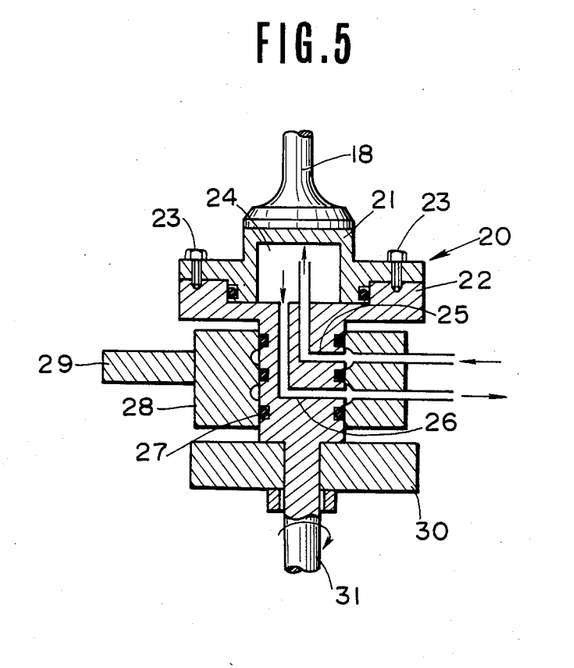
FIG. 5 is a longitudinally sectional view of the backing member used in the invention.

In FIG. 5 is shown a structure of the backing member 20, wherein the base material (valve) 18 is held at its bottom side by a backing disc 21. This backing disc 21 is fixed to a backing body 22 by means of bolts 23. Further, a cooling space 24 is defined between the backing disc 21 and the backing body 22, at where a cooling water is circulated through cooling water passages 25, 26 formed in the backing body 22.

The backing body 22 is fitted into a ring block 28 through plural O-rings 27. The ring block 28 is fixed to a supporting arm 29 for supporting the backing member 20.

Further, a back plate 30 is disposed on the lower side of the backing body 22, while a shaft 31 is integrally united with the lower end of the backing body 22 and connected to a rotary driving means (not shown) in such a manner that the backing member 20 is rotated in an arrow direction at a state holding the base material 18.

Figure 6A:
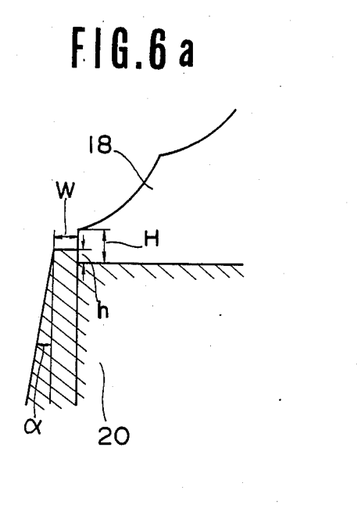
FIGS. 6a and 6b are schematic views illustrating the position relation between the side edge of the base material and the side edge of the backing member, respectively.
Figure 6B:
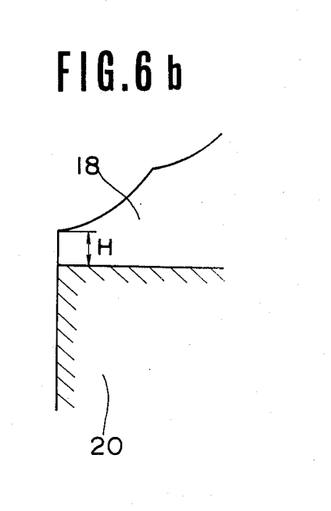

Moreover, as shown in FIGS. 6a and 6b, the base material 18 is attached to the backing member 20 so as to satisfy the following relationship:

$$h \leq 1.0H, \ w \leq 2.0H, \ \alpha < 90°$$

wherein H is a height of the sid edge of the base material 18, h is a height of the backing member 20 (in the illustrated embodiment, backing disc 21) protruding from the bottom of the base material 18 along the side edge thereof, w is a width of the backing member 20 protruding from the side edge of the base material 18, and $\alpha$ is an inclination angle of a side edge of the backing member 20. Particularly, FIG. 6b shows a case of h=0, w=0 and $\alpha=0°$.

Figure 7:
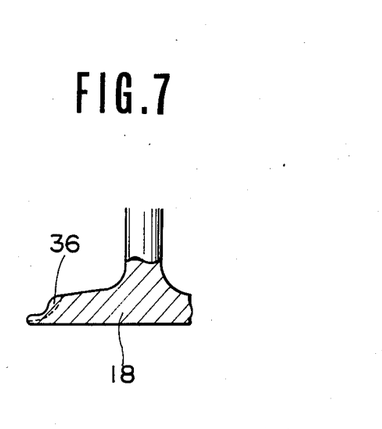
FIG. 7 is a schematic view illustrating the deformation of weld portion at the end of the valve face.

If the side edge portion of the backing member 20 largely produces from the side edge of the base material 18 so as not to satisfy the above relationships, the flows of the plasma working gas and the powder carrying gas pass along the surface of the base material 18 and come into collision with the side edge surface of the backing member 20 to cause disordering of these gas flows. As a result, a fused deposition metal 35 (shown in FIG. 2) surfaced on the face of the base material 18 is flown to the central side (axial side) of the base material 18 by the disordered plasma arc flow, so that an end portion of a deposited metal after the solidification exhibits a deformed shape as shown in FIG. 7.

On the other hand, the case that the base material 18 is locally supported by the backing member 20 (i.e. h and w are negative values), and the case that the side edge of the backing member 20 is inclined inward (i.e. $\alpha$ is a negative value) are included in the invention.

In the practice of the powder surface welding according to the invention, a negative pole of a powder source (not shown) is connected to the bar electrode 2 and a positive pole there of is connected to the base material 18, whereby a plasma arc 10 is produced between the bar electrode 2 and the base material 18, and at the same time the surfacing powder 14 supplied into the plasma arc 10 together with the powder carrying gas is deposited on the surface of the base material 18 (valve face) at a fused state.

Since the flow regulating member 8 for the plasma working gas is disposed between the bar electrode 2 and the inner tube 3, the plasma working gas becomes even and uniform at its horizontal section to enhance the concentricity of the plasma gas so that the supply of the surfacing powder 14 is uniformized at the horizontal section and the uneven loss of the bar electrode 2 is prevented to achieve the good surface welding. Further, the plasma arc 10 and a portion of the base material 18 to be surfaced are effectively shielded from exterior by the shield gas, whereby a good surface-welded layer can be obtained.

As the electrode in the plasma torch is used a bar electrode made, for example, of a high melting metal (or alloy) such as tungsten or the like. In this case, the whole of the electrode may be made from the high melting material such as tungsten or the like, or the electrode may consists of a plasma arc generating portion made of the high melting portion and the other remaining portion made of an electrically conductive water-cooled pipe or the like.

As the surfacing powder, use may be made of thermal resistant alloys and abrasion resistant alloys, particularly Co-based alloys such as stellite, Ni-based alloys such as colmonoy, Fe-based alloys such as FMS, and so on. When the surfacing powder contains a great amount of large-size particles, the non-fusing of the powder is unfavorably caused in the surface welding with the plasma arc, while when the small-size particles are too large in the powder, the amount of the powder splushed becomes large to reduce the yield, and the cutting of the small-size particle is poor at the last stage of the surface welding because the supply of small-size particles is apt to be delayed as compared with the supply of large-size particles and consequently a low weld bead as shown in FIG. 1a is formed to deteriorate the form of weld bead. On the other hand, when the welding speed is too slow, good weld bead form can not be obtained. For these reasons, according to the invention, the welding is carried out at a welding speed of not less than 3.8 m/sec by using a surfacing powder containing not less than 95% of powder having a particle size of $-60$ mesh to $+250$ mesh.

In order to provide good flowing of the surfacing powder in the prasma arc together with the powder carrying gas, it is desirable to use powders obtained by a powder producing process with a cooling rate slower than that of liquid atomization process, such as gas atomizing or gas-water atomizing. That is, the powder obtained by the liquied atomization is frequently irregular in the shape, ununiform in the supplying and insufficient in the fusion by plasma arc, while almost of the powders obtained by the gas atomization or gas-water atomization process are close to spherical shape and relatively regular, so that they are smoothly supplied and sufficiently fused by the plasma arc to provide a considerably good weld bead form.

As the surfacing powder satisfying the above requirements, there are powders produced by gas-liquied mixed gas atomization as disclosed in Japanese Patent Application Publication No. 53-11269 and No. 53-26591, which are preferably used in the invention.

Figure 8:
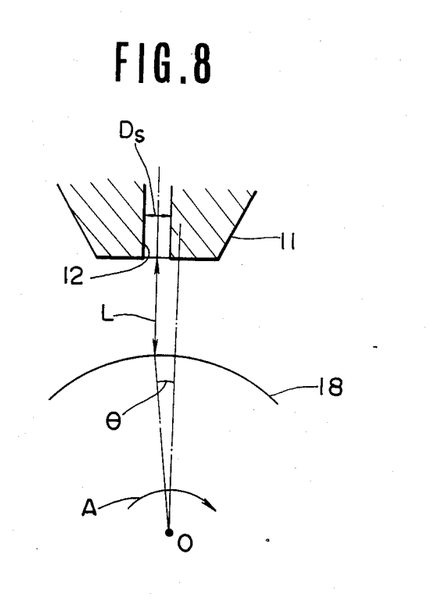
FIG. 8 is a schematically plan view illustrating the position relation between the plasma torch and the base material.

In the operation of the aforesaid plasma torch, the powder surface welding is performed under such conditions that as shown in FIG. 8, a distance (L,mm) between the end of the plasma arc jetting nozzle 12 and the base material 18 is within a range of $0.5\text{Ds}+6\leq L\leq\text{Ds}+8$, wherein Ds is a diameter (mm) of the nozzle 12, and an offset angle ($\theta$) of axial center of the plasma torch with respect to the rotational center of the base material 18 is $7°\leq\theta\leq 20°$ at a delay angle side or a side opposite to the rotational direction of the base material shown by an arrow A.

When the distance L exceeds the upper limit, the distance between the bar electrode 2 connected to the negative pole of the power source and the base material 18 connected to the positive pole of the power source becomes too long and also the plasma arc 10 is unstable, resulting in the bad weld bead form and the lack of fusion against the base material 18. While, when the distance L is less than the lower limit, the plasma arc 10 strongly tends to throw away the fused metal from the portion of the base material to be surfaced, resulting in the deterioration of the weld bead form. On the other hand, when the offset angle $\theta$ is less than 7°, the weld bead form is poor and the lack of fusion against the base material 18 is caused, while when the offset angle $\theta$ exceeds 20°, the fused metal falls down on the base material 18 to deteriorate the weld bead form and to cause the lack of fusion.

Figure 9:
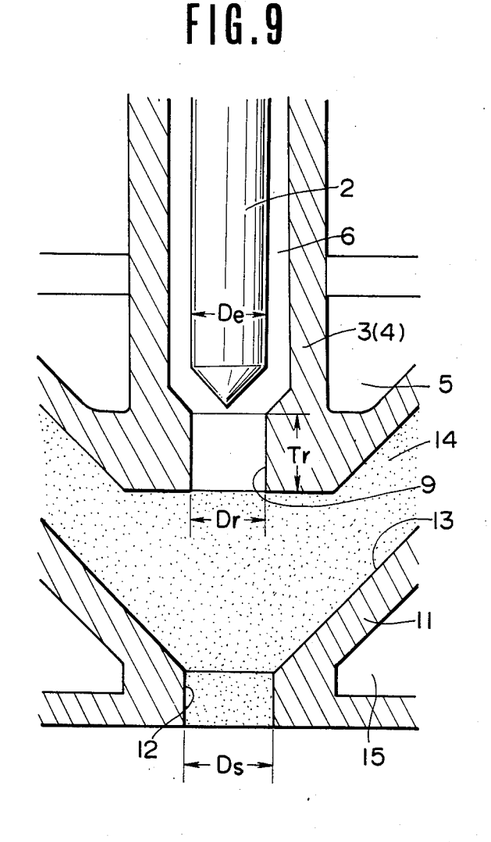
FIG. 9 is an enlarged sectional view of the nozzle part in the plasma torch shown in FIG. 2.

As shown in FIG. 9, it is preferable that the powder surface welding is performed so as to satisfy the following reactions:

$$Dr=(0.6\sim 0.9)\times Ds,$$

$$Tr=(0.9\sim 1.1)\times Dr,$$

$$De\approx 0.9\times Dr$$

wherein De is a diameter (mm) of the bar electrode 2, Dr is an opening diameter (mm) of the plasma arc restraining nozzle 9, Tr is a nozzle thickness (mm) of the nozzle 9, and Ds is an opening diameter (mm) of the plasma arc jetting nozzle 12. In this case, the stabilization and concentricity of the plasma arc are enhanced to sufficiently fuse the surfacing powder, whereby a good surface weld layer can be obtained in a high yield.

Moreover, it is desirable that the current density of the bar electrode 2 is not more than 13.5 A/mm$^2$. If the current density is too excessive, the consumption of the electrode becomes large and the life thereof is shortened.

As the plasma working gas is used an inert gas such as Ar gas, N$_2$ gas, mixed gas thereof or the like. When the amount of the plasma working gas used is too small, it is difficult to form a stable plasma arc, while when it is too large, the fused metal is thrown away to deteriorate the weld bead form. Therefore, according to the invention, the amount of the plasma working gas used (l/min.mm$^2$) is controlled to satisfy $(0.03\sim 0.13)\times\frac{1}{4}\pi Dr^2$, wherein Dr is the opening diameter (mm) of the plasma arc restraining nozzle 9.

According to the invention, the inert gas as described above is also used as a powder carrying gas. If the amount of the powder carrying gas used is too small, it is difficult to supply the surfacing powder, while if it is too large, the fused metal is thrown away to deteriorate the weld bead form. Therefore, according to the invention, the powder carrying gas is used in an amount of not more than 0.4 l/min, preferably 0.1–0.3 l/min based on 1 g/min of the surfacing powder supplied.

Furthermore, in order to obtain a good form of weld bead, the surface welding is carried out at a welding speed of not less than 3.8 mm/sec, preferably not less than 4 mm/sec. When the welding speed is less than 3.8 mm/sec, the good weld bead can not be formed.

Particularly, when the surface welding is applied to the valve face for automobile engine, it is desirable to conduct the welding without weaving in order to provide a good form of weld bead.

The invention will be explained more clearly by means of the following examples together with comparative examples.

EXAMPLE 1

In this example, a face of an exhaust valve for automobile engine (diameter: 50 mm) was subjected to a surface welding with a surfacing powder (produced by gas atomization of Stellite #12) having a particle size distribution as shown in the following Table 1 at a welding speed shown in Table 1 by using the plasma torch shown in FIG. 2 under a main current of 100 A and an arc voltage of 36 V.

size particles as shown in Comparative Examples, the good weld bead can not be obtained.

EXAMPLE 2

In this example, a face of an exhaust valve for automobile engine (diameter: 50 mm) was subjected to a surface welding using the plasma torch of FIG. 2 under the conditions as shown in the following Table 2. In this case, the nozzle diameter Ds (mm) of the plasma arc jetting nozzle 12, the distance L (mm) between the end of the plasma torch and the base material 18 and the offset angle $\theta$ were changed as shown in the following Table 3 to examine the resulting weld bead form and the fusion state against the base material 18. The thus obtained results are also shown in Table 3.

TABLE 2

| Arc welding current | 115 A |
|---|---|
| Arc welding voltage | 38 V |
| Plasma working gas | Ar |
| Powder carrying gas | Ar |

TABLE 1

| | Particle size distribution (%) | | | | | | |
|---|---|---|---|---|---|---|---|
| Run No. | −100 mesh | −100 mesh ~+150 mesh | −150 mesh ~+200 mesh | −200 mesh ~+250 mesh | −250 mesh ~+325 mesh | Welding speed (mm/sec) | Bead form |
| Example according to the invention | | | | | | | |
| 1 | 5 | 25 | 30 | 40 | 0 | 12.5 | ∆ |
| 2 | 0 | 35 | 35 | 30 | 0 | " | ○ |
| 3 | 0 | 31 | 35 | 30 | 4 | " | ○ |
| 4 | 4 | 25 | 36 | 30 | 5 | " | ○ |
| 5 | 0 | 45 | 30 | 25 | 0 | " | ○ |
| 6 | 4 | 21 | 15 | 55 | 5 | " | ○ |
| 7 | 0 | 55 | 45 | 0 | 0 | " | ⊚ |
| Comparative Example | | | | | | | |
| 8 | 10 | 30 | 30 | 30 | 0 | " | X |
| 9 | 5 | 35 | 35 | 15 | 10 | " | X |
| 10 | 0 | 40 | 30 | 20 | 10 | " | X |

Figure 10A:
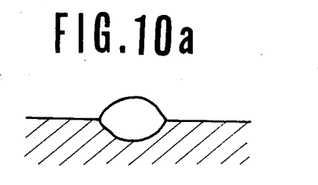
FIGS. 10a to 10d are schematic view illustrating the form of weld bead, respectively.
Figure 10B:
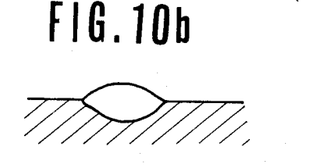
Figure 10C:
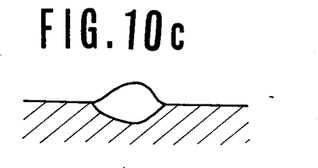
Figure 10D:
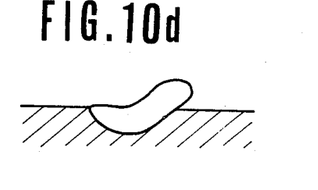

Note:
⊚ excellent (FIG. 10a),
○ good FIG. 10b or 10c),
∆ slightly good,
X bad (FIG. 10d)

As apparent from Table 1, when the surface welding is carried out at a welding speed of not less than 3.8 mm/sec with a surfacing powder containing not less than 95% of powder with a particle size of −100 mesh ~ +250 mesh, the resulting weld bead is good in

| Surfacing powder | Stellite #6 (−100~+250 mesh: not less than 95%) |
|---|---|
| Weaving of plasma torch | none |

TABLE 3

| Run No. | Nozzle diameter D (mm) | Distance L (mm) | Offset angle $\theta$ (°) | Welding speed (mm/sec) | Weld bead form | Fusion state |
|---|---|---|---|---|---|---|
| Example according to the invention | | | | | | |
| 1 | 4.0 | 9.0 | 10 | 8 | ○ | ○ |
| 2 | 4.0 | 10.0 | 10 | 8 | ⊚ | ○ |
| 3 | 4.0 | 11.0 | 15 | 8 | ⊚ | ○ |
| 4 | 4.0 | 8.0 | 15 | 8 | ○ | ⊚ |
| 5 | 4.0 | 9.5 | 20 | 8 | ○ | ○ |
| 6 | 3.2 | 10.5 | 20 | 8 | ⊚ | ○ |
| Comparative Example | | | | | | |
| 7 | 4.0 | 9.0 | 5 | 8 | X | X |
| 8 | 4.0 | 7.5 | 10 | 8 | X | ○ |
| 9 | 4.0 | 6.0 | 15 | 8 | X | ○ |
| 10 | 4.0 | 13.0 | 20 | 8 | ○ | X |
| 11 | 4.0 | 11.0 | 25 | 8 | X | X |
| 12 | 4.0 | 7.0 | 25 | 8 | X | X |

Note:
Symbols ⊚, ○, ∆ and X are the same as in Table 1.

the form. However, when the surfacing powder contains a large amount of smaller-size particles or larger- As apparent from Table 3, when the distance L between the plasma torch end and the base material and the offset angle θ are within the ranges defined in the invention, both the weld bead form and fusion state are satisfactory, while when the distance L and the angle θ are outside the defined ranges, satisfactory weld bead form and fusion state can not be obtained.

EXAMPLE 3

The surface welding of an exhaust valve face for automobile engine was carried out in the same manner as described in Example 2 under the conditions of Table 2, except that the amount of the plasma working gas used, the opening diameter of the plasma arc restraining nozzle, the amount of the surfacing powder used, the amount of the powder carrying gas used and the welding speed were changed as shown in the following Table 4. The form of weld bead was visually observed to obtain a result as shown in Table 4.

EXAMPLE 4

The surface welding of an exhaust valve face for automobile engine (diameter: 50 mm, height of side edge: 2 mm) was carried out in the same manner as described in Example 2 under the conditions of Table 2, except that the height h and width w of the backing member 20 protruding from the bottom of the base material 18 and the inclination angle α of side edge of the backing member 20 were changed as shown in the following Table 5. The form of weld bead was examined to obtain a result as shown in Table 5.

TABLE 5

| | Backing member | | | | |
| Run No. | Protruding height h (mm) | Protruding width w (mm) | Inclination angle α (°) | Welding speed (mm/sec) | Form of weld bead |
| --- | --- | --- | --- | --- | --- |
| Example according to the invention | | | | | |
| 1 | 1.5 | 1.9 | 80 | 500 | ⊚ |
| 2 | 1.8 | 3.8 | 0 | " | ⊚ |
| 3 | 1.0 | 1.0 | 0 | " | ⊚ |
| 4 | 0 | 0 | 0 | 200 | ○ |
| 5 | 0 | 0 | −45 | 500 | ⊚ |
| Comparative Example | | | | | |
| 11 | 2.2 | 1.8 | 0 | 500 | X |
| 12 | 1.5 | 4.2 | 0 | " | X |
| 13 | 1.2 | 1.8 | 100 | " | X |
| 14 | 2.5 | 4.5 | 0 | " | X |
| 15 | 2.2 | 1.8 | 100 | " | X |

Note:
Symbols ⊚, ○ and X are the same as in Table 1.

As apparent from Table 5, when the protruding height and width of the backing member 20 and the inclination angle of the side edge thereof are too large, the good weld bead form dan not be obtained satisfactorily.

TABLE 4

| Run No. | Amount of plasma working gas (l/min) | Opening diameter of plasma arc restraining nozzle (mm) | Amount of surfacing powder (g/min) | Amount of powder carring gas (l/min) | Welding speed (mm/sec) | Form of weld bead |
| --- | --- | --- | --- | --- | --- | --- |
| Example according to the invention | | | | | | |
| 1 | 1.0 | 3.5 | 18.6 | 5.5 | 9.0 | ⊚ |
| 2 | 0.4 | 3.5 | 18.6 | 2.5 | 9.0 | ○ |
| 3 | 0.3 | 2.8 | 10.0 | 1.5 | 9.0 | ○ |
| 4 | 2.7 | 7.0 | 25.0 | 8.0 | 12.1 | ○ |
| 5 | 2.8 | 6.0 | 25.0 | 4.0 | 12.1 | ○ |
| 6 | 1.96 | 5.0 | 25.0 | 2.5 | 12.1 | ○ |
| Comparative Example | | | | | | |
| 11 | 1.54 | 3.5 | 18.6 | 5.5 | 8.0 | X |
| 12 | 0.8 | 7.0 | 25.0 | 7.0 | 8.0 | poor fusion |
| 13 | 1.2 | 3.5 | 18.6 | 8.0 | 9.0 | X |
| 14 | 2.8 | 6.0 | 25.0 | 12.5 | 12.1 | X |

Note:
Symbols ⊚, ○ and X are the same as in Table 1.

As apparent from Table 4, when the amount of the plasma working gas is too small, poor fusion is produced in the weld part, while when the amount of the plasma working gas and/or the powder carrying gas is too large, the fused metal is thrown away to deteriorate the weld bead form.

EXAMPLE 5

A disc having a diameter of 30 mm and a thickness of 10 mm was subjected to a surface welding with 30%Cr-2%Fe-Ni powder as a surfacing powder 4 in a plasma torch having the structure shown in FIG. 2 and a specification as shown in the following Table 6. The life of the bar electrode 2 was measured to obtain a result as shown in Table 6.

TABLE 6

| Run No. | Opening diameter of plasma arc restraining nozzle 9 Dr (mm) | Nozzle thickness of nozzle 9 Tr (mm) | Diameter of bar electrode 2 De (mm) | Opening diameter of plasma arc jetting nozzle 12 Ds (mm) | Current desity (A/mm$^2$) | Life of electrode (Hr) |
| --- | --- | --- | --- | --- | --- | --- |
| Example according to the invention | | | | | | |
| 1 | 3.5 | 3.2 | 4.8 | 4.0 | 8.7 | 203 |
| 2 | 3.5 | 3.2 | 4.0 | 4.0 | 10.5 | 120 |
| 3 | 6.0 | 6.0 | 5.6 | 7.0 | 8.1 | 320 |
| 4 | 6.0 | 6.0 | 5.6 | 7.0 | 12.3 | 150 |
| 5 | 6.0 | 6.0 | 5.6 | 7.0 | 14.4 | 103 |
| Comparative Example | | | | | | |
| 6 | 6.5 | 7.2 | 5.6 | 7.0 | 13.1 | 36 |
| 7 | 2.0 | 1.2 | 3.2 | 4.0 | 9.8 | 8 |

As described above, in the powder surface welding method according to the invention, the form of weld bead is considerably good and also the fusion state between the deposite metal and the base material to be surfaced is remarkably good. Particularly, even when the powder surface welding is applied to a ring-like portion to be surfaced such as engine valve face for automobile vehicle or the like, good weld bead form and fusion state can be obtained satisfactorily. Further, the invention makes possible to stabilize the plasma arc and enhance the concentricity of the plasma arc, so that the consumption of the electrode is small, and the life of the electrode is considerably prolonged, and the flow of the surfacing powder is uniformized to make the amount of the deposited metal constant.

What is claimed is:

1. A method for surfacing an engine valve with a surfacing powder by means of a plasma torch comprising supplying a plasma working gas from a space between a bar electrode and an inner tube surrounding the bar electrode and supplying a surfacing powder from a space between the inner tube and an outer tube surrounding the inner tube to a jetting nozzle to form a plasma arc while rotating the engine valve, wherein said surfacing powder contains not less than 95 percent of powder having a particle size of $-60$ mesh to $+250$ mesh, and the surfacing is carried out at a relative surfacing speed of not less than 3.8 mm/sec. and wherein a distance L (mm) between the end of said plasma arc jetting nozzle and said engine valve is within a range of $$9.5Ds + 6 \leq L \leq Ds + 8$$

(wherein Ds is an opening diameter (mm) of the plasma arc jetting nozzle) and an offset angle ($\theta$) of the axial center of said plasma torch with respect to the rotational center of said engine valve is within a range of $$7° \leq \theta \leq 20°$$

at a delay angle side.

2. A method according to claim 1 wherein said surfacing powder is produced by gas atomization process.
3. A method according to claim 1 wherein said surfacing powder is produced by gas-water atomization process.
4. A method according to claim 1 wherein said surfacing powder is selected from Co-base-base alloys, Ni-base alloys and Fe-base alloys.
5. A method according to claim 1 wherein said particle size is within a range of $-100$ mesh to $+250$ mesh.
6. A method according to claim 1 wherein said surfacing speed is not less than 4 mm/sec.
7. A method according to claim 1 wherein said surfacing is carried out with a single pass surfacing.
8. A method according to claim 1 wherein said surfacing is carried out without weaving said plasma torch.
9. A method according to claim 1 wherein said bar electrode has a current density of not more than 13.5 A/mm$^2$.
10. A method according to claim 1 wherein an amount of said plasma working gas used (l/min.mm$^2$) is $$(0.03 \sim 0.13) \times \tfrac{1}{4}\pi Dr^2$$

in which Dr is an opening diameter of the plasma arc restraining nozzle.

11. A method according to claim 1 wherein said surfacing powder is used together with not more than 0.4 g/min of powder carrying gas based on 1 g/min of said powder.
12. A method according to claim 1 wherein said engine valve is held by a backing member satisfying the following relations:

$$h \leq 1.0H,$$

$$w \leq 2.0H,$$

$$\alpha \leq 90$$

in which
H is a height of a side edge face of said engine valve,
h is a height of the backing member protruding from the bottom of the engine valve,
w is a width of the backing member protruding from the side edge face of the engine valve and is an inclination angle of a side edge face of the backing member.

13. An apparatus for surfacing an engine valve with a surfacing powder by means of a plasm a torch comprising a bar electrode, an inner tube surrounding the bar electrode to define a passage for a plasma working gas, an outer tube surrounding the inner tube to define a passage for a surfacing powder, a plasma arc jetting nozzle at the end of said outer tube for emitting a plasma arc toward said engine valve, a flow regulating member provided with plural holes for passing the plasma working gas and disposed between said bar electrode and said inner tube, means defining a shield gas passage outside said outer tube surrounding the plasma arc jetting nozzle, and an annular flow regulating member for the shield gas disposed in said shield gas passage adjacent to but spaced from the lower end of the outer tube wherein said plasma torch satisfies the following relationships $$Dr = (0.6 \sim 0.9) \times Ds,$$

$$Tr = (0.9 \sim 1.1) \times Dr,$$

$$De \leqq 0.9 \times Dr$$

in which
  Dr is an opening diameter (mm) of a plasma arc restraining nozzle formed in the end of the inner tube,
  Ds is an opening diameter (mm) of the plasma arc jetting nozzle,
  Tr is a nozzle thickness (mm) of the plasma arc restrainng nozzle, and
  De is a diameter (mm) of the bar electrode.

14. An apparatus according to claim 13 wherein said flow regulating member is provided with a central aperture for the bar electrode to maintain the bar electrode concentric with said inner tube.

15. An apparatus according to claim 13 wherein said holes of the flow regulating member are arranged in a straight form at circumferentially equal intervals.

16. An apparatus according to claim 13 wherein said holes of the flow regulating member are arranged in a spiral form at circumferentially equal intervals.

* * * * *

UNITED STATES PATENT AND TRADEMARK OFFICE
CERTIFICATE OF CORRECTION

PATENT NO. : 4,621,183

DATED : November 4, 1986

INVENTOR(S) : Yukou TAKEUCHI and Masaru NAGATA

It is certified that error appears in the above-identified patent and that said Letters Patent is hereby corrected as shown below:

Column 5, lines 52 and 61, change "liquied" to -- Liquid --.
Column 6, line 34, change "∼" to -- ≥ --.
Column 10, line 37, change "dan" to -- can --.
Column 10, line 64, change "4" to -- 14 --.
Column 11, line 49, change "2.5" to -- 0.5 --.
Column 11, line 56, change "0" to -- θ --.
Column 11, line 65, change "base-base" to -- base --.
Column 12, line 35, change "g", first occurrence, to -- $\ell$ --.
Column 12, line 44, change "α ≤ 90 " to -- α < 90° --.
Column 12, line 51, insert -- α -- between "and" and "is".
Column 13, line 9, change "≤" to -- ≥ --.

Signed and Sealed this

Twenty-fourth Day of November, 1987

*Attest:*

DONALD J. QUIGG

*Attesting Officer*      *Commissioner of Patents and Trademarks*